Dec. 3, 1968 J. MANASTER 3,413,681
APPARATUS FOR FLATTENING POULTRY MEAT
Filed June 9, 1966 3 Sheets-Sheet 1
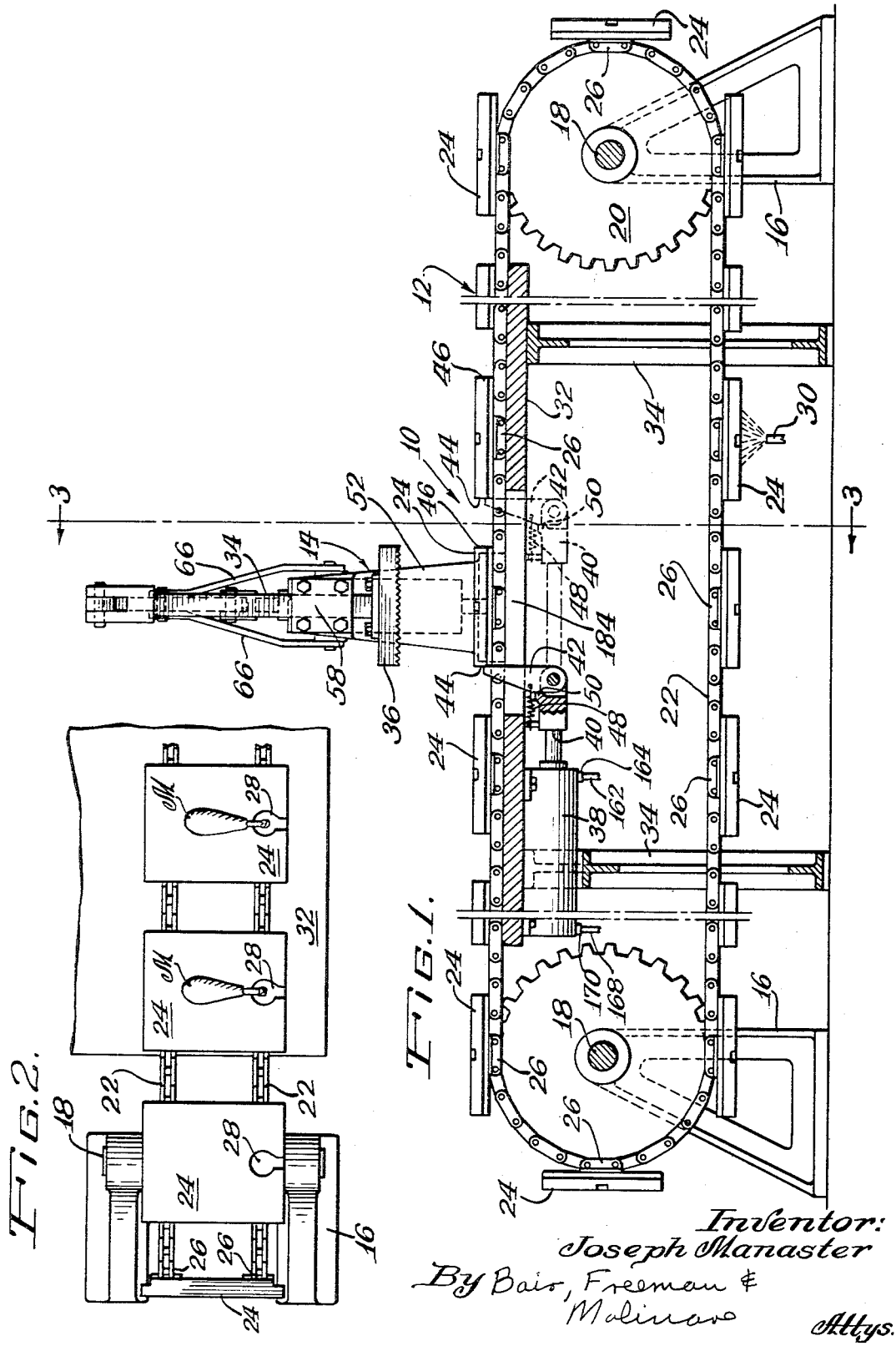
Inventor:
Joseph Manaster
By Bair, Freeman &
Molinare
Attys.

Dec. 3, 1968 J. MANASTER 3,413,681
APPARATUS FOR FLATTENING POULTRY MEAT
Filed June 3, 1966 3 Sheets-Sheet 2

Inventor:
Joseph Manaster
By Bair, Freeman & Molinare
Attys.

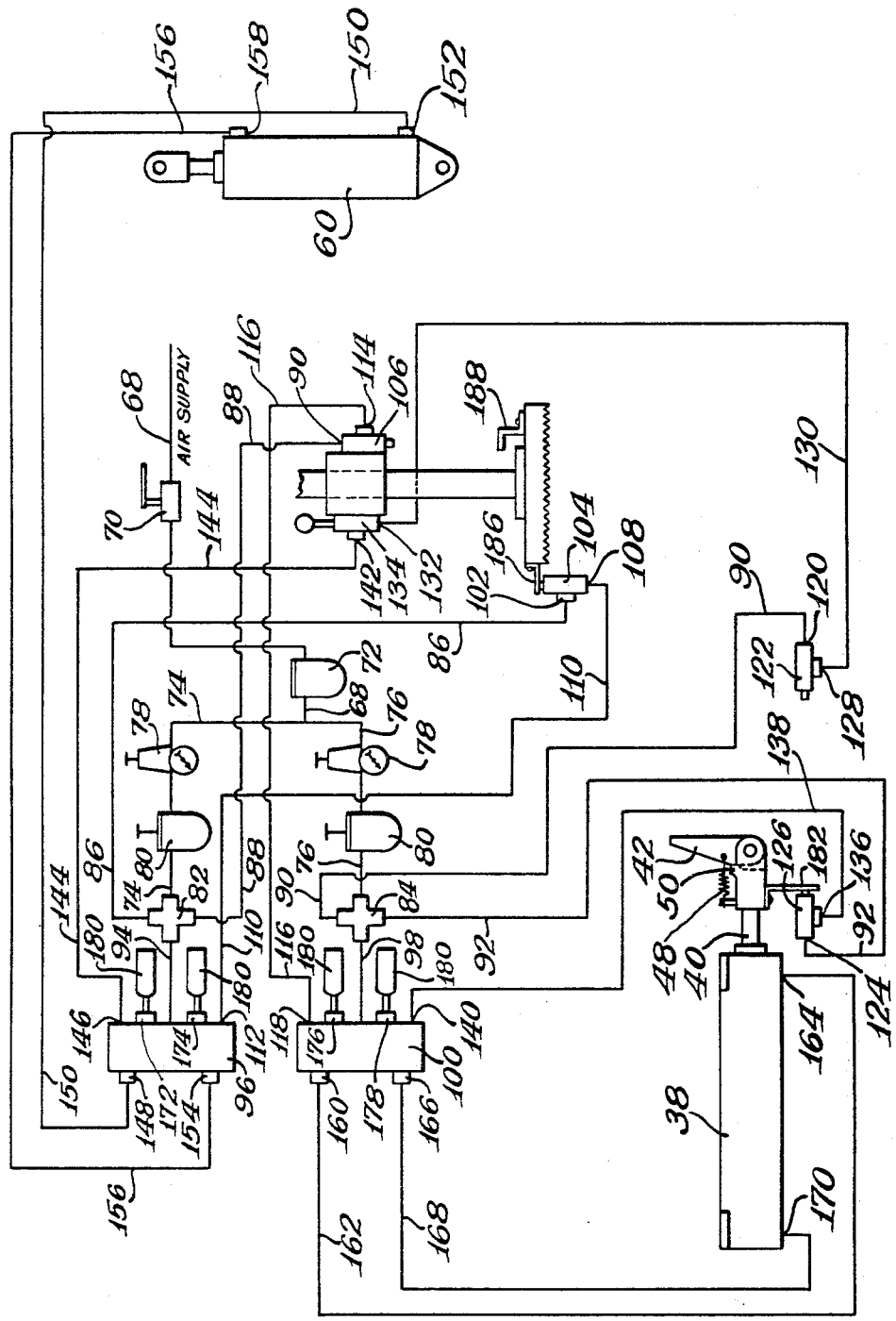

United States Patent Office 3,413,681
Patented Dec. 3, 1968

3,413,681
APPARATUS FOR FLATTENING
POULTRY MEAT
Joseph Manaster, 1238 W. George St.,
Chicago, Ill. 60657
Filed June 9, 1966, Ser. No. 556,312
4 Claims. (Cl. 17—25)

ABSTRACT OF THE DISCLOSURE

A conveyorized meat-tenderizing machine for flattening poultry meat having a bone extending therefrom is provided by a plurality of plates that are advanced in stepwise fashion into register with a press plate for tenderizing the meat. Each plate has a depression therein for accommodating the bone; the press plate is formed with teeth; and air-cylinder means are utilized for forcing the press plate against the meat so as to tenderize without crushing the bone. Lost motion means accommodate the interaction between the air-cylinder and press plate. Separate air-cylinder means are provided for advancing the plates in step-wise manner.

---

This invention relates to improved apparatus for flattening or pressing meat pieces and it particularly relates to improved apparatus for flattening poultry meat, especially the gourmet type, so as to provide uniformity for the processed meat.

In processing gourmet poultry products, the poultry, such as a chicken breast or leg, is usually deboned. In preparing certain poultry products after deboning, the meat is folded or wrapped around the leg or thigh bone of a chicken to enable a person to readily grasp the processed piece of chicken. It is highly desirable that such products be substantially uniform in size and appearance. The desired uniformity is accomplished by compressing the individual poultry products to a uniform thickness. In the compressing step, it is also necessary to avoid crushing of the bone around which the meat is wrapped. In the past, it has been the common practice for an operator to utilize a hand mallet to strike the product to effect the desired flattening. However, this common prior practice is undesirable not only because such hand operations are time consuming and expensive, but also because the desired product uniformity was not provided.

It is therefore an important object of this invention to provide improved apparatus for flattening or pressing poultry meat wherein the meat is compressed to substantially uniform thickness so as to provide uniformity in appearance for the processed poultry pieces.

It is also an object of this invention to provide improved apparatus for flattening poultry pieces wherein the meat is compressed between a reciprocating press and a plate maintained at a fixed height relative to the lowermost position of the moving press.

It is a further object of this invention to provide an improved apparatus for flattening poultry pieces wherein the apparatus is characterized by its simplicity and economy of construction, manufacture and operation.

In the construction of apparatus used for processing meat, one of the important considerations is that the apparatus must be maintained under sanitary conditions. The equipment must be washed after use and also is to be maintained in a clean condition during use. One of the problems encountered with such requirements is that when electrical equipment is used with meat processing equipment, there is danger involved in water contact with the electrical components. Thus, if electrical equipment is used, water proof and/or splash proof equipment must be used which significantly increases the cost of the equipment.

It is therefore a further object of this invention to provide improved apparatus for treating poultry meat wherein the apparatus is devoid of electrical equipment and utilizes air only for operating the apparatus.

It is yet another object of this invention to provide improved poultry treating apparatus wherein the apparatus is washed during the processing and is otherwise maintained in a sanitary condition as a result of the design of the apparatus.

Further purposes and objects of this invention will appear as the specification proceeds.

One particular embodiment of the present invention is illustrated in the accompanying drawings wherein:

FIGURE 1 is a side elevational view of our improved apparatus for effecting the flattening of poultry meat pieces;

FIGURE 2 is a fragmentary top plan view of the conveyor portion of the apparatus of FIGURE 1;

FIGURE 5 is a schematic view of the control means for the embodiment of FIGURE 1.

Figure 3:
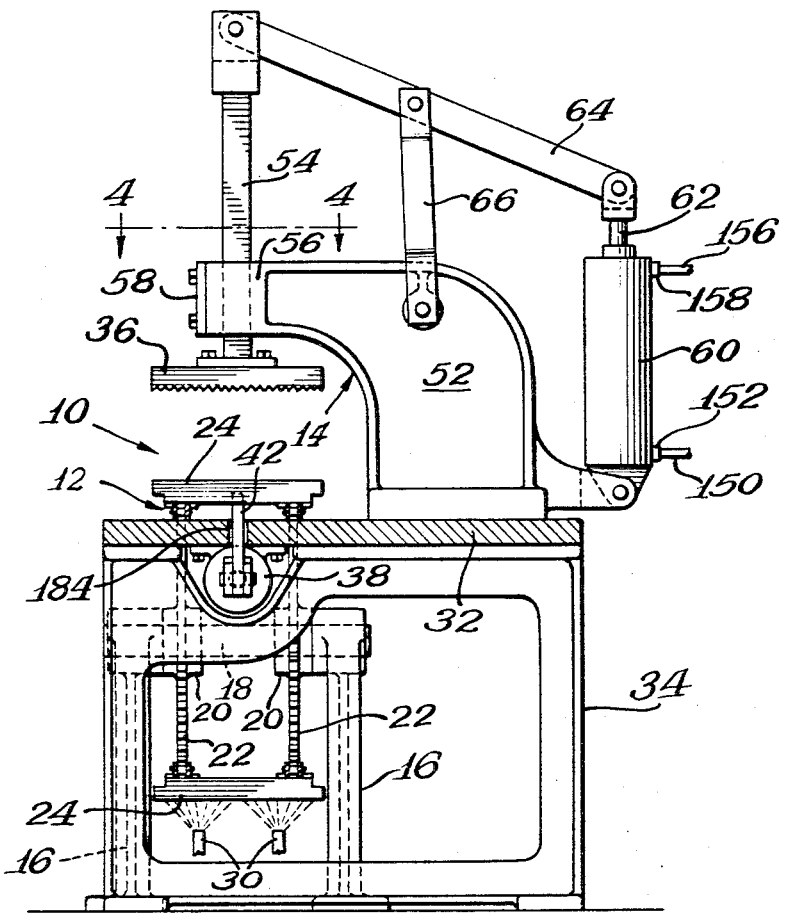
FIGURE 3 is a cross-sectional view taken along the line 3—3 of FIGURE 1.
Figure 4:
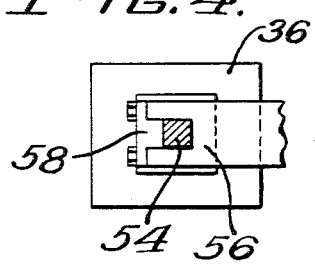
FIGURE 4 is a cross-sectional view taken along the line 4—4 of FIGURE 3.

Referring to the drawings and particularly FIGURES 2 and 3, our improved poultry treating apparatus 10 is shown in detail. The apparatus 10 includes a horizontally movable conveyor mechanism, generally 12, which carries poultry meat M into aligned position for processing directly below a vertically movable press member, generally 14. Although in the following description, only a single conveyor and a single press are described, it is to be understood that the conveyor may be of any desired length and the conveyors may be placed in side-to-side relationship and any desired number of press members may be used therewith.

The horizontally movable conveyor 12 is mounted on two pairs of upright support members 16 which are positioned at the opposite ends of the conveyor 12. Each pair of support members 16 rotatably carry a shaft 18 upon which is affixed a pair of sprocket wheel members 20. The sprocket wheels 20 are spaced on each shaft 18 and these spaced sprocket wheels 20 are in alignment with the pair of sprocket members 20 carried on a spaced shaft 18. A pair of link chains 22 engage the aligned sprocket wheels 20 and each chain 22 passes between the spaced shafts 18.

A plurality of plate members 24 are secured to the outer sides of the link members 26 which make up the chains 22. The central underside portions of the plate members 24 are fixed to spaced links 26 of each chain so as to enable the plate members 24 to readily pass around the sprocket wheels 20 in the manner shown in FIGURE 1. As shown most clearly in FIGURE 2, a depressed portion 28 is provided at one side of the central portion of each plate 24. Since some of the poultry meat which is compressed by the apparatus 10 may be wrapped around the leg bone of a chicken, the enlarged end of a chicken bone is received within the depressed portion 28 so as to avoid crushing thereof.

An operator first places a piece of poultry meat M upon the plate 24 prior to the flattening operation. After the flattening operation, the meat is removed from the plates 24 and the plates 24 are then carried around one of the sprocket wheels 20 and pass under the conveyor 12 in the return movement. During this return movement, the plates 24 are washed by spray water directed upwardly thereagainst by water spray nozzles 30. Thus, the plates 24 are in a clean and sanitary condition before receiving another chicken piece.

In our construction, it is an important feature that the portion of the conveyor 12 which is below the press 14 is supported by a rigid support plate 32. The link chains 22 pass across the upper side of the support plate 32 in sliding contact therewith. The plate 32 is supported by a pair of upright support members 34 located at the opposite ends of the plate 32. Since the conveyor chains 22 pass along the upper surface of the plate 32, the press plate 36 of the press 14 acts to compress the meat M carried by the plate members 24 to a uniform thickness with a uniform pressure. This feature provides a preselected spacing between the press plate 36 in the full down position and the upper surface of the plate members 24 so as to provide the desired results. The provision of a uniformly processed product is a highly desirable characteristic for food processing equipment.

The actual movement of the conveyor 12 and plate members 24 past the press 14 is accomplished by a double acting air cylinder 38. The air cylinder 38 is mounted to the central underside of the support plate 32 longitudinal of the conveyor 12. The piston rod 40 of the air cylinder 38 pivotally carries at its outer end a spring biased arm 42 which is normally maintained in the raised position. As shown in FIGURE 1, when the arm 42 is in the raised position, it engages the trailing edge 44 of a plate member 24. After the meat has been compressed, the air cylinder 38 is actuated to act against the plate 24 to index it and the entire conveyor 12 forward. After the plate 24 has been moved the appropriate distance so that a plate 24 containing a meat piece is aligned below the press plate 36, the air pressure applied to the piston (not shown) within the air cylinder 38 moves the piston rod 40 back to the starting position. The reverse movement of the piston rod 40 causes the arm 42 to strike the leading edge 46 of a plate member 24 and to pivot thereunder. When the rod is returned to the start position, the spring member 48 pivots the arm 42 to the upright position so as to engage the trailing edge 44 of a following plate member 24. The arm is held in the vertical position by a stop portion 50 at the forward end of the piston rod 40 which resists the biasing of the spring 48.

The press 14 is an air actuated arbor press. An upright press frame 52 is mounted on the upper surface of the support plate 32. A vertically reciprocating ram 54 is slidably carried at the forward end of the outwardly extending arm 56 of the press frame 52. The arm 56 extends over the conveyor 12 so that the ram 54 and the press plate 36 mounted below are in vertical alignment over the plate members 24 mounted upon the conveyor chains 22. The press plate 36 is substantially coextensive in size with each plate member 24 and is provided with teeth or serrations on the lower surface to assist in tenderizing the meat product while avoiding rupturing the cells thereof. An upright plate 58 is mounted to the open front face of the arm 56 so as to maintain the ram 54 in sliding attachment to the press frame 52.

A substantially upright air cylinder 60 is pivotally carried at the lower rear portion of the frame 52. The outwardly extending end of the piston rod 62 is pivotally connected to one end of a link 64 whose opposite end is pivotally connected to the upper end of the ram 54. At a point intermediate the opposite ends of the link 64, one end of each of a pair of arms 66 is pivotally attached thereto while the lower end of the arms 66 are pivotally attached to the press frame. Since both the arms 66 and air cylinder 60 are pivotable on the press frame 52, as the piston (not shown) within the air cylinder 60 reciprocates within the cylinder and the piston rod 62 moves up and down, both the arms 66 and air cylinder 60 will pivot on the frame 52 while the ram 54 is moved in a vertical up and down direction. The stroke of the piston in the air cylinder 60 permits the lower surface of the press plate 36 to move within the desired preselected distance from the upper surface of the plate members 24 so that at the full down position of the ram the desired uniform compression is applied to all the poultry meat pieces. The air cylinder 60 also raises the press plate 36 to a desired distance above the plate members 24 to permit the transfer of the processed piece of meat from below the plate 36 and to permit the transfer of the next meat product to the proper position below the plate 24.

Referring to the schematic diagram of FIGURE 5, the control system for the apparatus 10 will be described. In our construction, it is an important feature that only air is utilized to control and operate the apparatus 10. The use of air advantageously avoids the use of electrical devices to thereby preclude problems associated with washing electrical devices, which is necessary to maintain sanitary conditions for the processing of food products. An air supply line 68 provides an air supply at approximately 100 pounds per square inch. A manually operated on-off air valve 70 is connected in the line. The air in the line 68 passes to an air filter 72 after which the line 68 divides into two branch lines 74 and 76. A pressure regulator valve 78 is mounted in both of the lines 74 and 76. An oiler unit 80 is included in each line 74 and 76 after the regulator 78. After passing through the oiler 80, the air line 74 is connected to a first cross 82 and the air line 76 is connected to another cross 84. At the cross 82, the air line 74 divides into two air switch lines 86 and 88. At the cross 84, the air line 76 branches into two air switch lines 90 and 92. A main air line 94 passes from the cross 82 to a reversing valve 96 and a main air line 98 passes from the cross 84 to a second reversing valve 100.

The air line 86 from the cross 82 passes to the inlet side 102 of an air switch 104 while the other air switch line 88 passing from the cross 82 enters the inlet side 90 of another air switch 106. The outlet 108 of the air switch 104 is connected to an outlet line 110 which in turn is connected to a lower port 112 on the reversing valve 96. The outlet 114 of the air switch 106 is connected to an outlet line 116 which passes to an upper port 118 on the reversing valve 100. The air line 90 passing from the cross 84 is connected to the inlet 120 of an air switch 122 and the other air line 92 passing from the cross 84 is connected to the inlet 124 of an air switch 126. The outlet 128 of the air switch 122 is connected to an outlet line 130 which passes through the inlet 132 of a manually operated air switch 134, which during operation of the apparatus is maintained in the open position. The outlet 136 of the switch 126 is connected to an outlet air line 128 which passes to a lower port 140 on the reversing valve 100. The outlet 142 of the manually operated air switch 134 is connected to an outlet line 144 which in turn is connected to an upper port 146 of the reversing valve 96.

The reversing valve 96 includes a port 148 connected to an air line 150 which is connected to a port 152 on the air cylinder 60 which operates the ram 54. Another port 154 on the reversing valve 96 is connected to a line 156 which passes to a port 158 at the opposite end of the air cylinder 60. In the reversing valve 100, a port 160 is connected to an air line 162 which passes to a port 164 at one end of the air cylinder 38 which operates the conveyor 12. Another port 166 on the reversing valve 100 is connected to an air line 168 which is connected to a port 170 at the opposite end of the cylinder 38.

The reversing valve 96 includes an exhaust port 172 and an exhaust port 174, while the reversing valve 100 includes an exhaust port 176 and an exhaust port 178. A silencer 180 is connected to each of the exhaust ports 172, 174, 176, and 178 to reduce the amount of noise resulting from the release of the compressed air.

The reversing valves 96 and 100 are of conventional construction and form no part of the invention. These devices are four way reversing valves of a type which are commonly used in connection with alternately applying air pressure to opposite ends of the piston in a double acting air cylinder. One suitable reversing valve useful in our apparatus is sold under the trademark Versa. The air switches 104, 106, 122, and 126 are also of known construction. These air switches, after being actuated or tripped, permit a surge of air to pass through their outlet lines and, in the present case, to pass to the ports of the reversing valves. This surge of air from an air switch acts against a diaphragm in the reversing valve which reciprocates a shaft. The shaft has a series of O-rings thereon to permit air pressure to be alternately applied to the ports 148 and 154 of the valve 96 or to the ports 160 and 166 of the valve 100. At the same time, the exhaust ports on the reversing valves are alternately connected to the ports 148, 154 or 160, 166 depending upon which is the pressure side of the piston and which is the exhaust side. Thus, the function of the air switches is to provide a surge of air to operate the reversing valves 96 and 100. The operation to be hereinafter set forth will provide a clear understanding of the operation of the described apparatus and associated control system.

In the operation of our apparatus 10, an operator first places poultry meat M as pieces of deboned chicken wrapped around a chicken bone, upon the plates 24 prior to movement of the plate member 24 to a position below the press plate 36. The enlarged end of the bone is placed in the depressed portion 28 of the plate members 24 to avoid crushing thereof. The rod 40 of the air cylinder 38 is moved back to the starting position and the pivoted arm 42 moves to a position in contact with the trailing edge 44 of a plate member 24. As seen in FIGURE 5, the rod 40 has mounted thereon a tripping arm 182 which contacts the actuating button of the air switch 26. This contact permits a surge of air to pass through the air line 92, through the inlet 124, through the outlet line 138, and into the port 140 of the reversing valve 100. This causes a surge of pressurized air to shift the porting of the reversing valve 100. This shifting causes pressurized air to pass from the main air inlet line 98, through the inner porting of the valve 100, through the port 166, through the air line 168, and to the port 170 in the cylinder 38. The shifting of the valve porting also causes the exhaust port 176 to become interconnected to the port 160 and the air line 162 which is then connected to the exhaust end of the cylinder 38. Thus, line 168 is the pressure line and the line 162 is the exhaust line. The pressurized air in the line 168 moves the piston in the cylinder 38 forward which causes the arm 42 to act against the trailing edge of a plate member 24 and move the plate member 24 with a flattened piece of chicken away from below the press plate 36, while also moving the next plate 24 containing an unprocessed piece of chicken to position below the plate 36. A cut-out longitudinal slotted portion 184 is provided in the central portion of the support plate 32 intermediate the chain members 22 to permit the passage of the arm 42 upwardly therethrough for contacting the plate members 24.

When the piston of the air cylinder 38 reaches the forward end of the stroke and has moved a plate with a piece of chicken in an aligned position below the press plate 36, the arm 182 on the piston rod 40 contacts the actuating button of the air switch 122 to permit a surge of air to pass through the outlet 128, through the outlet line 130, and to the manual air switch 134, which is maintained in the open position at all times when the machine is operating. Air then passes outwardly through the switch outlet 142, through the air line 144, and to the upper port 146 of the reversing valve 96. This surge of air, in a manner similar to the operation of the valve 100, causes shifting of the porting of the valve 96. The air pressure from the main air line 94 passes through the porting in the valve 96, through the outlet 148, and through the air line 150 to the lower end of the air cylinder 60. At the same time, the port 154 becomes connected to the exhaust 174 so that air exhausts through the line 156 connected to the upper end of the air cylinder 60. Thus line 156 is the exhaust line and line 50 is the pressure line. This drives the piston rod upwardly and thereby the link 64 drives the ram 54 downwardly to flatten the meat that is placed on the plate 24 thereunder to the desired uniform thickness.

When the ram 54 reaches the bottom end of the stroke, a tripping arm 186 connected to the side of the plate 36 contacts an actuating button on the air switch 104. The pressurized air passes from the air line 86 through the switch 104 and into the air line 110. The air line 110 passes to the lower end of the reversing valve 96 to cause reverse shifting of the porting of the valve 96. This causes air from line 94 to be applied to the line 156 and the line 150 also becomes the exhaust line. Since the pressurized air passes through the upper port 158 of the cylinder 60, the piston is driven downwardly so as to raise the ram 54 due to the interconnection with the link 64.

When the ram 54 has reached the upper end of its stroke, an actuating arm 188 mounted on the plate 36 contacts an actuating button on the air switch 106. This permits a surge of air to pass from the air line 88 through the switch 106 and through the outlet line 116. The air passes from the line 116 to the upper end of the air valve 100 causing a surge of air to shift the porting of the valve 100. Pressurized air then passes from the pressure line 98 to the line 162 which is connected to the forward port of the air cylinder 38. At the same time, the exhaust port 178 becomes connected to the line 168 through the valve 100 so that the line 168 becomes the exhaust line. Since pressurized air is passing through the port 164, the piston rod 40 reverses back to the starting position. The arm 42 contacts the leading edge of the plate containing the chicken which has just been processed and pivots thereunder. After it moves under the plate, the spring 48 pivots the arm 42 upwardly to again cause contact with a trailing edge of a plate 24. At this time, the arm 182 again actuates the air switch 126 to start another cycle of operation.

It is seen from the foregoing description that all of the objects previously set forth have been accomplished. A highly efficient and simple piece of equipment is provided for accomplishing the uniform flattening or compressing of pieces of chicken or other type of meat. The entire system is controlled by air, thereby avoiding the necessity of using electricity. The washing of the equipment thus presents no problem relative to electrical shorting. Also, portions of the apparatus which come in direct contact with the meat are maintained away from the operating elements of the equipment whereby lubricants and the like will not come into contact with the products being processed. Also, devices are provided for washing the plates 24 during the processing. Due to the arrangement of the conveyor on top of a support plate, a fixed relative distance is always maintained between the upper surface of the plates carrying the chicken and the lower surface of the press plate in its lowermost position. The maintenance of this spacing provides a uniform amount of compression for all the meat pieces so as to provide a substantially uniform final product.

While in the foregoing there has been provided a detailed description of a particular embodiment of the present invention, it is to be understood that all equivalents obvious to those having skill in the art are to be included within the scope of the invention as claimed.

What I claim and desire to secure by Letters Patent is:

1. In a conveyorized meat-treating machine for flattening the meat on a bone-carrying poultry part and utilizing a plurality of spaced meat-support plates arranged to intermittently move into and then away from a station where a meat-treating instrument is synchronized to move vertically toward and away from a plate positioned in alignment thereunder, the improvement comprising, in combination: support means over which the meat-support plates slide at a fixed distance below the meat-treating instrument when the instrument is in the fully lowered position, each meat-support plate having a depression therein for receiving a portion of the bone which is attached to the meat, so as to avoid crushing said bone portion; a press plate substantially coextensive in size with said meat-support plate and having teeth in the lower surface thereof for effecting tenderization of the meat; and air-cylinder means for effecting the thrusting movement of the press plate against the meat carried on the meat-support plate to effect tenderizing of the meat without crushing the bone.

2. A device as in claim 1 including pivot means operatively associated with the air cylinder means and press plate for accommodating lost motion between the air cylinder means and the press plate as said press plate is caused to move toward and away from a meat-support plate.

3. A device as in claim 1 including air-cylinder means for intermittently advancing the meat-support plates into and then away from the station where the meat is tenderized.

4. A device as in claim 3 wherein the support means has an elongated slot therein, a plate-pusher including an arm extending through said slot to engage a plate positioned on the support means, reciprocating air-cylinder means for moving the plate-pusher in opposite directions, and the plate-pusher arm being operative to move along said slot and to push a plate when moved from an initial position in one direction by the reciprocating air cylinder means, and said arm being constructed to move to an inoperative position when being returned to its initial position by the air-cylinder means.

References Cited

UNITED STATES PATENTS

| 2,492,387 | 12/1949 | Lundell | 17—1 |
| 2,559,270 | 7/1951 | Abbott | 17—25 |
| 2,976,656 | 3/1961 | Gardner. | |
| 3,213,486 | 10/1965 | Blake | 17—1 |
| 3,327,622 | 6/1967 | Lebovitz | 100—269 X |

LUCIE H. LAUDENSLAGER, *Primary Examiner.*